United States Patent

Yamada et al.

Patent Number: 5,134,101
Date of Patent: Jul. 28, 1992

[54] DIELECTRIC PORCELAIN FOR USE AT HIGH FREQUENCIES

[75] Inventors: Akira Yamada; Toshihisa Honda; Yoshikazu Utsumi; Hisao Watarai, all of Hyogo, Japan

[73] Assignee: Mitsubishi Denki Kabushiki Kaisha, Japan

[21] Appl. No.: 806,602

[22] Filed: Dec. 12, 1991

[51] Int. Cl.$^5$ .............................. C04B 35/40
[52] U.S. Cl. ................................... 501/136
[58] Field of Search ........................ 501/136

[56] References Cited

U.S. PATENT DOCUMENTS

| | | | |
|---|---|---|---|
| 4,438,214 | 3/1984 | Masuyama et al. | 501/136 |
| 4,859,641 | 8/1989 | Fujino et al. | 501/136 |
| 4,900,702 | 2/1990 | Tsuboi et al. | 501/136 |
| 5,002,913 | 3/1991 | Yamada et al. | 501/136 |
| 5,019,306 | 5/1991 | Huang et al. | 501/136 |

FOREIGN PATENT DOCUMENTS 61-198505 9/1986 Japan .

Primary Examiner—Mark L. Bell
Assistant Examiner—Deborah Jones
Attorney, Agent, or Firm—Wolf, Greenfield & Sacks

[57] ABSTRACT

The improved dielectric porcelain for use at high frequencies is represented by the general formula:

$$x SrO \cdot y CaO \cdot z[(1-m)TiO_2 \cdot m/2\{TaO_{5/2} \cdot (1-n)GaO_{3/2} \cdot n GdO_{3/2}\}]$$

[where $0.42 \leq x \leq 0.54$ (or $0.06 \leq x \leq 0.18$);

$0.06 \leq y \leq 0.18$ (or $0.42 \leq y \leq 0.54$);

$z = 0.40$;

$0.05 \leq m \leq 0.70$;

$0.00 \leq n \leq 1.00$;

$x + y = 0.6$]

with $Mn_2O_3$ being contained in an amount of up to 3 wt% of the total amount. The porcelain can be formulated from essentially similar basic compositions and yet it exhibits specific dielectric constants over a broad range on the order of 20-60 in the microwave frequency region and, at the same time, it has commerically acceptable high values of Q factor as well as stable and small temperature coefficients of dielectric constant.

2 Claims, No Drawings

DIELECTRIC PORCELAIN FOR USE AT HIGH FREQUENCIES

BACKGROUND OF THE INVENTION

This invention relates to dielectric porcelain that is suitable for use in the microwave frequency range in that it can be formulated from essentially similar basic compositions and that it yet exhibits specific dielectric constants over an extremely broad range while achieving commercially acceptable large values of Q factor as well as small and stable temperature coefficients of specific dielectric constant.

High-frequency dielectric porcelain is extensively used as resonators, filters, substrates, etc. in portable radio communication units, broadcasting satellites, microwave integrated circuits, etc. and they make great contribution to improvements in filter characteristics and their frequency stability and to miniaturization of equipment and circuits. Devices using such dielectric porcelain are opened at various frequencies and the necessary specific dielectric constant also varies with the operating frequency. The required dielectric characteristics vary with the type or model of device used. Under the circumstances, there would be a great benefit for designing versatile dielectric devices if there were materials having different dielectric characteristics in spite of similarities in the stability of electrical, physical and chemical properties such as insulation resistance, mechanical strength and water absorptivity because this would reduce the variations in design factors. Four major characteristics that are desired for such dielectrics are as follows: 1) they have specific dielectric constants over a broad range; 2) they are similar in properties other than dielectric characteristics; 3) they show low dielectric losses; and 4) they have high temperature stability in resonance frequency. To provide those characteristics, especially the second characteristic, the dielectrics must have similar basic formulations but excepting a few cases, no dielectrics have heretofore been found that satisfy this requirement. Among the exceptional dielectrics suitable for use at high frequencies that have similar basic formulations are BaTi$_4$O$_9$ and Ba$_2$Ti$_9$O$_{20}$ (BaTi$_{4.5}$O$_{10}$) which are described in J. of Am. Ceram. Soc., 58 (9-10), 418, 1975.

It is generally difficult to use the same basic formation (which is smaller in characteristics other than dielectric characteristics) and to obtain dielectric porcelain materials for use at high frequencies that have specific dielectric constants over a broad range, as well as low dielectric losses and small and stable temperature coefficients of dielectric constants. Each of the two prior art dielectric porcelain materials described in J. of Am. Ceram. Soc., supra, has a specific dielectric constant of approximately 40 and the range of specific dielectric constants that can be covered by similar basic formulations is extremely narrow.

SUMMARY OF THE INVENTION

The present invention has been achieved under these circumstances and has as an object providing dielectric porcelain for use at high frequencies that can be formulated from similar basic compositions and which yet exhibits specific dielectric constants over a broad range on the order of 20-60 in the microwave region while insuring commercially acceptable high values of Q factor as well as stable and small temperature coefficients of specific dielectric constant, thereby facilitating the development of desired devices.

This object of the present invention can be attained by dielectric porcelain for use at high frequencies that is represented by the general formula:

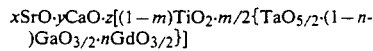

where $0.42 \leq x \leq 0.54$ (or $0.06 \leq x \leq 0.18$)

$0.06 \leq y \leq 0.18$ (or $0.42 \leq y \leq 0.54$)

$z = 0.40$ $0.05 \leq m \leq 0.70$ $0.00 \leq n \leq 1.00$ $x + y = 0.6$ with Mn$_2$O$_3$ being added in an amount of up to 3 wt % of the total amount.

DETAILED DESCRIPTION OF THE INVENTION

In a preferred embodiment, the dielectric porcelain of the present invention is prepared by mixing the necessary starting materials such as strontium carbonate, calcium carbonate, titanium oxide, tantalum oxide, gallium oxide, gadolinium oxide and manganese oxide and sintering the mixture. The resulting product is represented by the general formula:

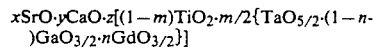

where $0.42 \leq x \leq 0.54$ (or $0.06 \leq x \leq 0.18$)

$0.06 \leq y \leq 0.18$ (or $0.42 \leq y \leq 0.54$)

$z = 0.40$ $0.05 \leq m \leq 0.70$ $0.00 \leq n \leq 1.00$ $x + y = 0.6$ with Mn$_2$O$_3$ being contained in an amount of up to 3 wt % of the total amount.

The compositional ranges of the respective components are determined in consideration of various factors and it is difficult to determine them uniquely. They also sometimes depend on the processing conditions that are employed in the manufacture of the dielectric porcelain of the present invention. Generally, the following observations may hold: if x is smaller than 0.06 or greater than 0.54, the Q factor will decrease; if $0.18 < X < 0.42$, the specific dielectric constant will increase but, on the other hand, both the Q factor and the temperature coefficient of specific dielectric constant will deteriorate; if m is outside the specified range, the temperature coefficient of specific dielectric constant will deteriorate. Outside the specified compositional ranges, there occurs deterioration in dielectric characteristics to make the porcelain material unsuitable for use as an engineering material. The addition of Mn causes a slight change in the temperature coefficient toward the positive side but if Mn is added in an amount exceeding 3 wt %, the Q factor will decrease.

TABLE 1

| Sample No. | Mol fraction | | | | Mn content (wt %) | Specific dielectric constant | Q | Temperature coefficient (ppm/°C.) |
| --- | --- | --- | --- | --- | --- | --- | --- | --- |
| | x | y | m | n | | | | |
| C-1 | 0.57 | 0.03 | 0.25 | 0.5 | 0.0 | 34 | 250 | −350 |
| C-2 | 0.54 | 0.06 | 0.04 | 0.5 | 0.0 | 35 | 650 | −400 |
| 1 | 0.54 | 0.06 | 0.20 | 1.0 | 0.0 | 37 | 1020 | −300 |
| 2 | 0.42 | 0.18 | 0.10 | 0.5 | 0.0 | 32 | 1100 | −250 |
| 3 | 0.42 | 0.18 | 0.20 | 0.5 | 0.0 | 30 | 1060 | −100 |
| C-3 | 0.32 | 0.24 | 0.20 | 1.0 | 0.0 | 120 | 550 | −1520 |
| C-4 | 0.24 | 0.36 | 0.30 | 0.0 | 0.0 | 72 | 600 | −1060 |
| 4 | 0.18 | 0.42 | 0.40 | 0.0 | 0.0 | 37 | 1080 | −80 |
| 5 | 0.18 | 0.42 | 0.50 | 1.0 | 0.0 | 55 | 1050 | −174 |
| C-5 | 0.12 | 0.48 | 0.04 | 0.0 | 0.0 | 100 | 1500 | −1240 |
| 6 | 0.12 | 0.48 | 0.10 | 0.5 | 0.0 | 33 | 1150 | −100 |
| 7 | 0.12 | 0.48 | 0.20 | 0.0 | 0.0 | 68 | 1100 | −152 |
| 8 | 0.12 | 0.48 | 0.20 | 0.5 | 0.0 | 33 | 1020 | −100 |
| 9 | 0.12 | 0.48 | 0.50 | 0.0 | 0.0 | 28 | 1120 | +15 |
| 10 | 0.12 | 0.48 | 0.40 | 0.0 | 0.0 | 41 | 1180 | −32 |
| 11 | 0.12 | 0.48 | 0.50 | 1.0 | 0.0 | 43 | 1150 | −11 |
| 12 | 0.12 | 0.48 | 0.70 | 1.0 | 0.0 | 32 | 1000 | −2 |
| C-6 | 0.12 | 0.48 | 0.80 | 1.0 | 0.0 | 30 | 600 | +50 |
| 13 | 0.12 | 0.48 | 0.20 | 0.0 | 0.3 | 67 | 1180 | −250 |
| 14 | 0.12 | 0.48 | 0.20 | 0.0 | 3.0 | 60 | 1000 | −175 |
| C-7 | 0.12 | 0.48 | 0.20 | 0.0 | 5.0 | 58 | 820 | −180 |
| 15 | 0.06 | 0.54 | 0.10 | 0.0 | 0.0 | 31 | 1080 | −125 |
| 16 | 0.06 | 0.54 | 0.20 | 0.0 | 0.0 | 28 | 1030 | −80 |
| 17 | 0.06 | 0.54 | 0.10 | 0.5 | 0.0 | 25 | 1010 | −50 |
| C-8 | 0.00 | 0.60 | 0.05 | 0.05 | 0.0 | 50 | 860 | −165 |

*C-1–C-8: Comparative Samples 1-8

The following example and comparative example are provided for the purpose of further illustrating the present invention.

EXAMPLE AND COMPARATIVE EXAMPLE

Commercial grades of strontium carbonate, calcium carbonate, titanium oxide, tantalum oxide, gallium oxide, gadolinium oxide and manganese oxide powders were weighed to provide the formulations shown in Table 1, which were then charged into a nylon ball mill pot together with zirconia balls and ethyl alcohol and mixed for 16 h. The resulting slurries were evaporated to dryness by heating at 100° C. for 3 h. The dried slurries were ground into particles and calcined at 1,100° C. for 3 h to formulate compound powders. The powders were ground into finer particles in a ball mill under the same conditions as described above and were subsequently dried. The dried powders were shaped at pressures of 700–800 kg/cm² into cylindrical bodies having a diameter of 16 mm and a height of 12 mm. The cylinders were sintered in an oxygen atmosphere at 1,400–1,550° C. for 4 h to prepare samples of the dielectric porcelain of the present invention.

Comparative samples of dielectric porcelain were prepared from the formulations shown in Table 1. The manufacturing process was the same as described above except that sintering was performed in an air atmosphere.

The samples thus prepared were machined to predetermined sizes and their dielectric characteristics (specific dielectric constant and Q factor) were measured at 5 GHz by a dielectric resonator method. The results of measurements are shown in Table 1 with respect to the specific dielectric constant, Q factor and the temperature coefficient of specific dielectric constant for each formulation. As one can see from Table 1, the samples of dielectric porcelain prepared in accordance with the present invention exhibited specific dielectric constants over a broad range on the order of 20–60 in the microwave range and, at the same time, they had satisfactorily high values of Q factor as well as small and stable temperature coefficients of specific dielectric constant.

The dielectric porcelain of the present invention is represented by the general formula:

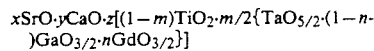

where $0.42 \leq x \leq 0.54$ (or $0.06 \leq x \leq 0.18$)

$0.06 \leq y \leq 0.18$ (or $0.42 \leq y \leq 0.54$)

$z = 0.40$ $0.05 \leq m \leq 0.70$ $0.00 \leq n \leq 1.00$ $x + y = 0.6$ with $Mn_2O_3$ being added in an amount of up to 3 wt % of the total amount. This dielectric porcelain exhibits specific dielectric constants over a broad range on the order of 20–60 in the microwave frequency region and, at the same time, it has commercially acceptable high values of Q factor as well as small and stable temperature coefficients of dielectric constant. Using this dielectric porcelain, efforts to improve the performance of IC substrates and other parts that are to be used with microwaves and to increase the latitude in device design can successfully be performed in an easy manner.

What is claimed is:

1. Dielectric porcelain for use at high frequencies that is represented by the general formula:

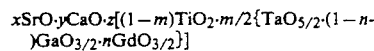

where $0.42 \leq x \leq 0.54$ $0.06 \leq y \leq 0.18$ $z = 0.40$ $0.05 \leq m \leq 0.70$ $0.00 \leq n \leq 1.00$ $x + y = 0.6$ with $Mn_2O_3$ being added in an amount of up to 3 wt % of the total amount.

2. Dielectric porcelain for use at high frequencies that is represented by the general formula:

$$xSrO \cdot yCaO \cdot z[(1-m)TiO_2 \cdot m/2\{TaO_{5/2} \cdot (1-n)GaO_{3/2} \cdot nGdO_{3/2}\}]$$

where $0.06 \leq x \leq 0.18$ $0.42 \leq y \leq 0.54$ $z = 0.40$ $0.05 \leq m \leq 0.70$ $0.00 \leq n \leq 1.00$ $x + y = 0.6$ with $Mn_2O_3$ being added in an amount of up to 3 wt % of the total amount.

* * * * *